Patented Jan. 10, 1950

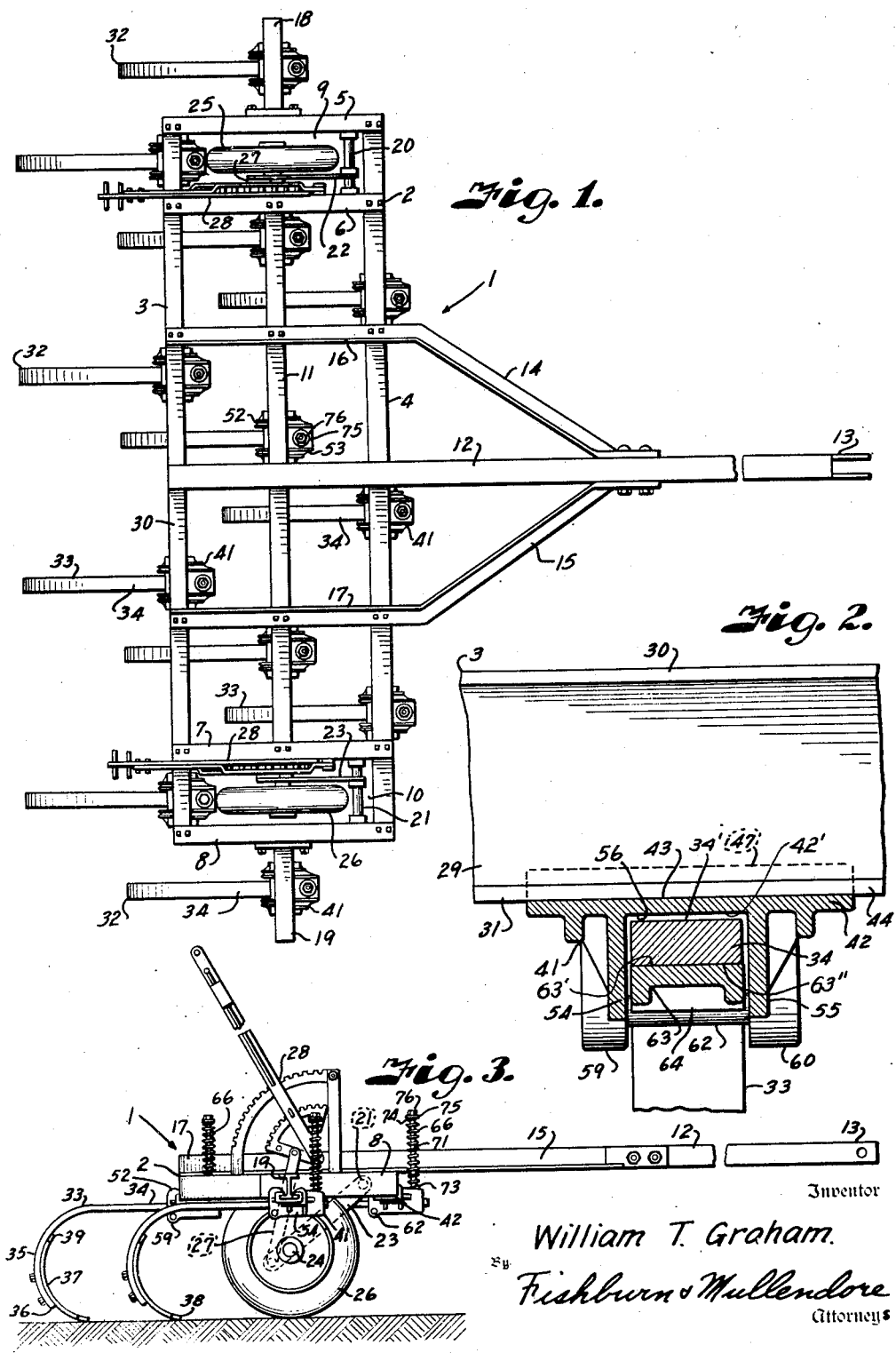

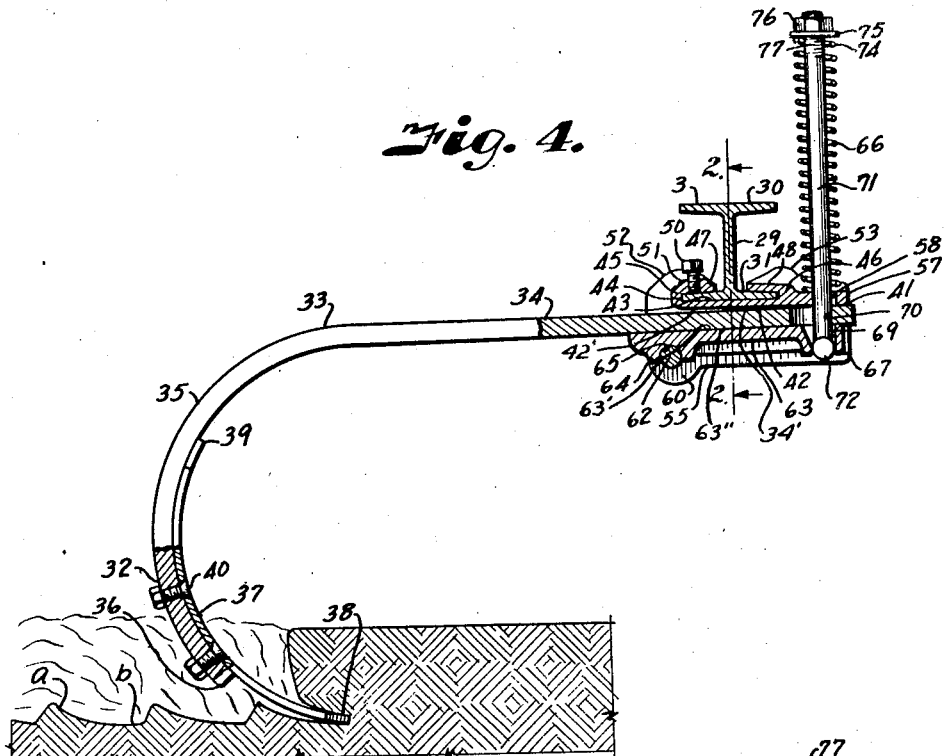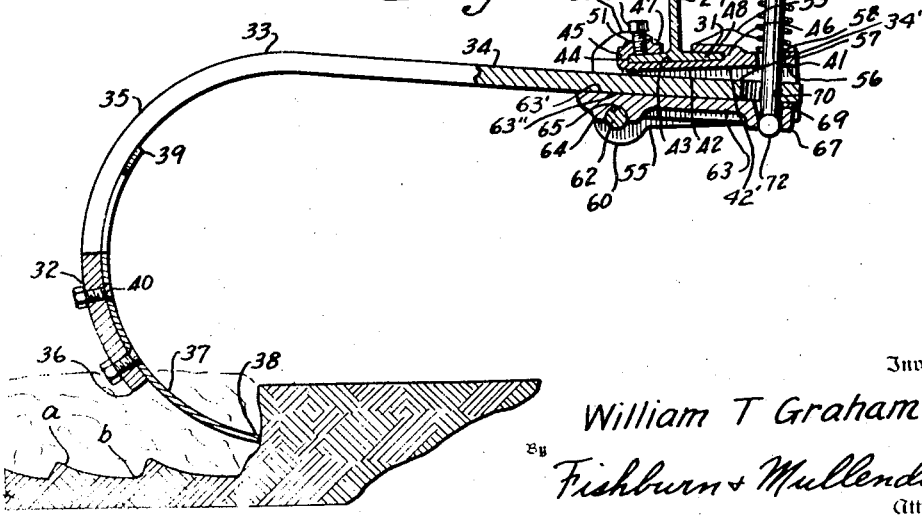

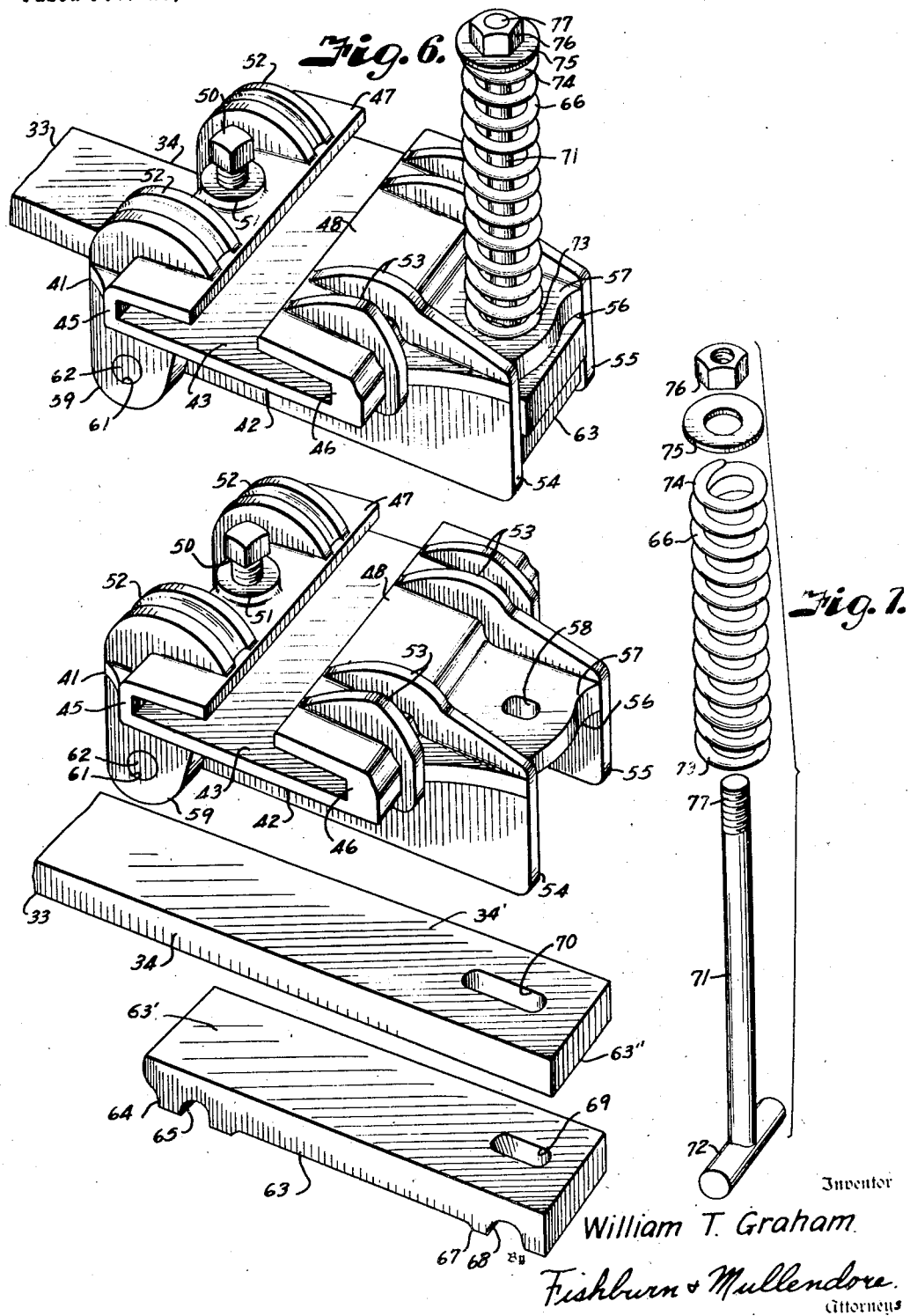

2,493,811

UNITED STATES PATENT OFFICE 2,493,811

VIBRATING PLOW AND MOUNTING THEREFOR

William T. Graham, Amarillo, Tex.

Application February 26, 1947, Serial No. 730,991

8 Claims. (Cl. 97—184)

This invention relates to plows of a type which includes a plurality of laterally arranged ground conditioning tools that work under the surface to heave and break the soil and form alternate ridges and furrows having exposed surfaces composed of clods, straw and other natural mulching material normally occurring on a field.

Plows of this character have proved most desirable because the ground prepared therewith is in condition for optimum moisture conservation and it is substantially free from erosion by water and wind. Also, the top soil does not dry out and form a hard crust since it is protected from the wind and sun by the mulching material with the result that better crop yields are obtained.

I have discovered that such plows can be made more effective by providing a pronounced pumping or vibratory action of the ground working tools. This action works the fine soils toward the bottom for forming the seed bed and the coarse materials to the top for forming a better mulch and moisture collecting surface. The pumping action also produces alternating pockets and ridges transversely of the bottoms of the furrows for collecting and storing small pools of moisture from which moisture is supplied to the loose soil of the seed bed by capillary action during dry periods. I have also determined that the pumping action of the tools results in an easier pulling plow and that less motive power is required.

Therefore, it is a principal object of the present invention to provide a plow of this character with tool mountings that result in maximum pumping action of the ground working tools.

Other objects of the invention are to provide a tool mounting that includes a sliding support on a fulcrum member for attaching the tools pivotally on the plow frame; to provide resilient means acting on one side of the fulcrum for retaining the tools in the ground and for producing the resiliency that results in pumping action of the tools; to provide means for selectively varying the pumping action in accordance with the hardness of the ground being worked; to provide a mounting for the ground working tools that reduces breaking and bending of the plow parts when operating in hard and rocky soils; to provide a resilient tool mounting that cooperates with the inherent resiliency of the shank of the ground working devices which results in a chiseling or gouging action of the ground working tools for forming the ridges and pockets in the bottoms of the furrows; and to provide a plow structure and tool mounting that is simple and reliable in operation.

In accomplishing these and other objects of the invention I have provided improved structure, the preferred form of which is illustrated in the accompanying drawing wherein;

Fig. 1 is a plan view of a plow constructed in accordance with the present invention.

Fig. 2 is an enlarged section through one of the tool mountings on the line 2—2 of Fig. 4.

Fig. 3 is a side elevational view of the plow showing the ground working tools in raised position.

Fig. 4 is an enlarged section through one of the ground working tools and its mounting and showing the tool in ground working position.

Fig. 5 is a similar view showing action of the tool to produce the chisel cuts or gouges in the bottom of the furrows.

Fig. 6 is a perspective view of one of the tool mounting units removed from the carrying frame and showing the end portion of the tool shank.

Fig. 7 is a perspective view of the parts of the unit arranged in spaced relative positions.

Referring more in detail to the drawings:

1 designates a plow constructed in accordance with the present invention and which includes a frame 2 composed of transverse beams 3 and 4 spaced apart at the ends thereof by pairs of longitudinal members 5—6 and 7—8 and which provide wheel pockets 9 and 10. The frame also includes an intermediate transverse beam 11 connecting the innermost longitudinal members 6 and 7.

Extending across the mid portions of the beams and suitably connected thereto is a tongue 12 having its forward end 13 arranged for connection to the draftbar of a tractor (not shown). The tongue 12 is suitably braced relative to the frame by bars 14 and 15 having rear ends 16 and 17 extending parallel with the longitudinal members 6 and 7 of the frame and which are secured to the transverse beams 3, 4 and 11. Extending from the end members 5 and 8 in aligning registry with the intermediate beam 11 are beam extensions 18 and 19.

Mounted at the forward end of the wheel pockets 9 and 10 and carried between the pairs of longitudinal members 5 and 6 and 7 and 8 are shafts 20 and 21 carrying arms 22 and 23 having wheel spindles 24 on their lower ends for journalling ground wheels 25 and 26.

The frame 2 is adapted to be raised and lowered with respect to the wheels 25 and 26 by connecting the free ends of the arms 22 and 23, through links 27, with lever mechanisms 28 whereby the ground working devices hereinafter described may be moved into and out of ground working position.

The ground working devices are carried by the transverse beams 3, 4 and 11 at spaced intervals along the lengths thereof and in staggered relation to form a plurality of spaced furrows when the plow is in use. The transverse beams of the plow frame are preferably of H-shaped cross section and arranged with the webs 29 in vertical position with the upper and lower flanges 30 and 31 extending horizontally.

The ground working devices 32 each include a shank or stem 33 of substantially rectangular cross section and of a width and thickness to provide a certain amount of resiliency. The stem or shank includes a substantially straight portion 34 adapted to extend in the direction of travel of the machine and a rearwardly and downwardly curved portion 35 which terminates in a forwardly curving end 36 for mounting ground working tools or blades 37. The tools 37 are correspondingly curved to seat within the curvature of the shanks and have sharpened ends 38 and 39 so that they may be reversed. The ground working tools are secured to the shanks by fastening devices such as plow bolts 40. The ground working tools when mounted are firmly supported within the curvature of the shanks and one of the pointed ends extends forwardly in position to work underground and cause the soil to heave and break and form a furrow.

In order to accomplish the objects of the present invention the ground working devices 32 are carried upon the beams by novel mountings arranged to give the tools the above described vibratory or pumping action. The mountings are of identical construction and each includes a bracket including a clamp member or part 41 having a plate portion 42 provided with a flat face 43 corresponding to the width of the lower flange 31 of the beams 3, 4 and 11 and which is adapted to closely engage therewith. Projecting laterally from the front and rear sides of the plate portion 42 and extending across the edges 44 of the lower flanges 31 are web portions 45 and 46 carrying inwardly extending flanges 47 and 48 that engage over the upper faces of the lower beam flanges 31.

The length of the plate portion 42 is such as to provide an ample contact area with the flanges 31 so as to assure a firm connection when the clamp is fastened to its beam by a set screw 50. The set screw 50 is threaded through a boss 51 formed on the upper face of the flange 47 so that the end thereof bears against the upper face of the flange to draw the plate portion 42 of the clamp tightly against the bottom face of the beam. The ends of the clamp member 41 are adequately ribbed as at 52 and 53 for reinforcing the beam contacting portions thereof.

Depending from the underside of each clamp member 41 are flanges 54 and 55 that are spaced apart to provide an open bottom channel or way 56 in which the end portions of the shanks of the ground working devices are anchored and adapted to pivot. The flanges 54 and 55 extend forwardly of the plate portion of the clamp member 41 on the respective sides of a forward extension 57 of the plate portion 42. The extension 57 has an elongated opening 58 extending substantially vertically therethrough with the longer axis arranged parallel with the flanges 54 and 55. Formed on the flanges 54 and 55 at the opposite ends thereof are depending ears 59 and 60 having transverse openings 61 in which are mounted the ends of a fulcrum or pivot pin 62 that extends across the way or channel 56, the pin 62 being carried in spaced relation with the plate portion 42 to accommodate therebetween the end portion of the shank 33 of a ground working device and a fulcrum plate or clamp part 63. The under side of the plate portion 42 between the flanges 54 and 55 forms a clamping portion or face 42' conforming with the upper face 34' of the end portion of the shank.

The fulcrum plate 63 having a clamping portion or face 63' is retained in contact with the lower face 63" of the forward end portion of the tool supporting shank and has a transverse rib 64 formed on the underside that is provided with a groove 65 opening downwardly to accommodate the pivot or fulcrum pin 62 and on which the fulcrum plate 63 together with the overlying end portion of the shank 33 are adapted to pivot or hinge under action of a spring 66 as now to be described.

The opposite end of the fulcrum plate has a similar rib 67 provided with a transverse groove 68 intersecting an elongated opening 69 that registers with the opening 58 previously described and with an elongated opening 70 provided in the forward end of the shank 33. Extending through the openings is a T-bolt or rod member 71 having a T-shaped head 72 adapted to rock within the groove 68. The rod 71 extends upwardly through the slot-like openings 69, 70 and 58 and projects a substantial distance above the bracket extension 57 on which an end 73 of the spring 66 seats. The other end 74 of the spring engages a spring seat or washer 75 that is sleeved on the upper end of the rod and retained against the upper end of the spring by an adjusting nut 76 mounted on a threaded end 77 of the rod as best shown in Figs. 6 and 7. The spring 66 is thus retained in compression to keep the head 72 in rocking engagement with groove 68 of the gripping portion or face 63' of the fulcrum plate 63 and the fulcrum plate in contact with the lower face 63" of the end portion of the shank 33 and the upper face 34' of the end portion of the shank 33 against the clamping portion 42' (as shown in Fig. 4). The ground working tools are thus resiliently supported between the clamping members or parts and are adapted to rock thereon as permitted by action of the springs to effect pumping action of the ground working tools incidental to drag of the tools through the ground and resiliency of the compression springs so as to produce the furrows and chisel cuts indicated at "a" and forming the pockets indicated "b" in Figs. 4 and 5 of the drawings.

In assembling the ground working devices 32 on the transverse beams 3, 4 and 11 of the plow frame 2, the clamp brackets 41 are slid onto the beams from the ends thereof when the frame 2 is being assembled. The brackets are spaced on their respective beams and in relation to the brackets of the other beams so as to equalize the draft on the respective sides of the tongue 12 and provide the desired spacing of the furrows. When the brackets 41 are in position they are rigidly anchored to the lower flanges 31 of the beams by tightening the set screws 50 which pull the brackets up against the bottom of the beam flanges. This clamping action of the brackets and contact of the brackets with the beam flanges rigidly anchor the brackets in position against forces applied thereto by the ground working devices 32 so that the ground working devices are retained in their fixed working positions.

In attaching the ground working devices the fulcrum plates 63 are inserted between the flanges 54 and 55 of the brackets and the rear ends are moved onto the fulcrum pins 62. The forward ends of the shanks 33 of the ground working devices are then projected through the space or channel between the plate portions 43 of the brackets 42 and the fulcrum plates 63 so that the slotted openings 70 in the forward ends register with the openings 58 and 69. The rods or T-bolts 71 are then applied by projecting the shanks upwardly through the registering openings 69, 70 and 58 until the T-shaped heads 72 thereof seat within the grooves 68. The springs 66 are then sleeved over the upper ends of the rods 71 so that the lower ends 73 seat against the extensions 57 of the brackets 41. The spring seats 75 and nuts 76 are then applied to the threaded ends 77 of the rods and the nuts tightened to compress the springs in a sufficient amount to retain resiliently the ground working devices in ground working position, the degree of compression of the springs being regulated in accordance with the hardness of the ground to be plowed.

In using a plow equipped with ground working devices as above described, the tongue 12 of the plow is attached to the draftbar of a tractor to be drawn thereby over the field to be plowed. When the plow is in position to start the furrows, the lever mechanisms 28 are actuated to lower the plow frame 2 with respect to the wheels 25 and 26 which brings the ground working tools 59 into contact with the soil and forward pull on the plow forces the ground working tools 59 into the ground to a depth as set by the lever mechanisms 28. Pull on the plow frame in one direction and resistance to the pull offered by the ground working tools in the opposite direction causes the shanks 33 to slide on the fulcrum plates 63 until the forward ends of the slotted openings 70 of the shanks move into stop engagement with the rods 71 to limit movement of the shanks relatively to the clamping portion of the members 63.

The fulcrum plates 63 are retained from shifting therewith by the pivot pins 62. Consequently, the relative positions of the heads 72 of the rods 71 are fixed but they rock within the grooves 68 of the fulcrum plates 63 until the rods 71 strike the rear ends of the elongated openings 58 of the mounting brackets 41. The springs normally urge the forward ends of the shanks 33 in contact with the bottom surfaces or clamping portions of the plate portions 42 of the brackets 41 and the fulcrum plates 63 with the gripping portions thereof against the under faces of the shanks to provide frictional resistance that cooperates with the springs 66 in anchoring the ground working devices to the plow frame.

As the plow moves forward the pointed ends 38 of the tools 37 work into the ground until the resistance is such as to cause rocking movement of the tool shanks 33 on the fulcrum pins 62 of the mounting brackets, with the forward ends moving the pivoted clamping members of the clamps away from the fixed or bracket members against action of the springs 66. During this action there is a slight longitudinal movement of the shanks on the fulcrum plates. When the soil breaks over the ground working tool, the spring is again effective to exert a lifting thrust on the forward ends of the shanks 33 which causes the tool carrying ends of the shanks to rock downwardly and produce downward and forward cut (a) in the soil until the resistance is again sufficient to cause the upward movement against action of the spring 66, which movements produce a constant rocking or pumping action of the tools to form a continuous series of pockets (b) in which moisture is adapted to collect. As the tool passes the broken and upheaved soil falls to the side and settles back into the furrow to cover the pockets, however shallow furrows are left between upstanding ridges without turning over of the soil. The pumping action of the tools also works the fine soil downwardly to form the seed bed and the larger clods, straw and other natural mulching material are worked to the surface for covering the fine soil and for serving as a mulch to preserve the moisture which collects in the furrow and in the bottom pockets thereof. As the ground dries after a rain, the moisture collecting in the pockets moves upwardly by capillary action to supply the seed bed while the clods and other mulching material preserves the moisture and prevents crusting over of the soil. Also, since the pockets "b" trap the water, the water has sufficient time to penetrate into the ground instead of running off. The furrows trap the rainfall and prevent washing and soil erosion. The roughage and mulching material left on the ground also protects the soil from wind erosion.

From the foregoing it is obvious that I have provided a plow structure wherein the pumping action of the ground working tools enhance the desirable features of the plow and that the pumping and constant movement of the ground working tools produces an easier draft. It is also obvious that my improved mounting reduces or eliminates breakage of the ground working devices since they yield automatically under action of the springs when they strike immovable objects such as rocks or other obstructions.

What I claim and desire to secure by Letters Patent is:

1. In a plow having a frame and a ground working device provided with a shank adapted to be attached to said frame, means for attaching the shank to the frame which results in pumping action of the ground working device when the plow is in use, including a bracket on the frame having a downwardly opening way extending in the fore and aft direction of the plow, a pin extending transversely across said way, a fulcrum plate pivotally mounted on the pin at one end and having its other end extending along said shank on the side of the pin opposite the ground working device, a rod having pivotal connection with the fulcrum member and extending through an elongated opening in said shank and through a registering opening of the bracket to anchor the shank to said bracket and provide sufficient longitudinal relative movement between the shank and fulcrum member to accommodate oscillation of the shank, and a spring having one end engaged with said rod and the other end engaged with the bracket for yieldingly permitting rocking movement of the fulcrum member for effecting said pumping action of the ground working device.

2. In a plow having a frame and a ground working device provided with a shank adapted to be attached to said frame, means for attaching the shank to the frame which results in a pumping action of the ground working device in the frame when the plow is in use, including a bracket on the frame having a downwardly opening way extending in the fore and aft direction of the plow, a pin extending transversely of said way, a fulcrum plate pivotally mounted on the pin at one end and having its other end extending along said shank on the side of the pin opposite the ground working device, a rod having pivotal connection with the fulcrum member and extending through an elongated opening in said shank and through a registering opening of the bracket to anchor the shank to said bracket and provide sufficient longitudinal relative movement between the shank and fulcrum member to accommodate oscillation of the shank on the bracket, a spring sleeved on said rod and having one end seated on the bracket, and means on the rod engaging the other end of the spring to retain the fulcrum member in contact with said end of the shank and said end of the shank in contact with the bracket, said spring being yieldable to effect said pumping action of the ground working device.

3. In an apparatus of the character described, a plow frame including a transverse beam having a flange on its lower edge, a tool supporting shank extending across said lower flange, a bracket, means attaching the bracket to said flange, a fulcrum on the bracket, a fulcrum plate pivoted on the fulcrum and having a transverse groove intersected by an opening through said fulcrum plate and registering with elongated openings in the shank and bracket, a rod extending through said openings and having a T-shaped head engaged in said groove, a spring on the rod having one end bearing on the bracket, a washer on the rod engaging the other end of the spring, and a nut threaded on the rod and engaging the washer to compress said spring and retain the fulcrum plate in contact with the shank and the shank in contact with the bracket.

4. In an apparatus of the character described, a plow frame including a transverse beam having a flange on its lower edge, a bracket fixed to said flange and having depending laterally spaced flanges, a tool supporting shank extending forwardly between said flanges, a pin extending transversely between the flanges of the bracket at a point below the shank, a fulcrum plate pivoted on said pin and extending forwardly in supporting engagement with the shank, a rod pivotally connected with the fulcrum plate and extending through registering openings in said shank and bracket to anchor the shank for limited longitudinal movement on the fulcrum plate, a spring on the rod having one end bearing against the bracket, a washer on the rod engaging the other end of the spring, and a nut threaded on the rod and engaging the washer to compress said spring for retaining the tool in the ground and yielding in response to resistance on said tool when the plow is in operation to produce a pumping action of the tool in the soil.

5. In a plow having a frame and a ground working tool provided with a shank adapted to rock relatively to the frame when the plow is in operation in a forward direction, a mounting for attaching and supporting the shank of the ground working tool from the frame including a clamp fixedly attached to the frame, the clamp including a part that is fixed to the frame and another part pivotally mounted on the fixed part, the shank having an end portion thereof between said parts and in movable engagement with the said parts, a coil spring having one end thereof in engagement with one of said parts, means at the other end of the spring connected with the other of said parts to maintain the spring in position and for holding the said parts of the clamp with the end portion of the shank therebetween in their resiliently held-together association so that when the shank is rocked or moved the end portion of the shank between the parts will cause the movable part of the clamp to move away from the fixed part along with said end portion and back to normal position with the end portion of the shank contactingly held between the two parts, and means on one of the parts engageable with a part of the end portion of the shank to prevent disengagement of the shank from the clamp but to allow same to rock.

6. In a device as claimed in and by claim 5, wherein the fixed part of the clamp is of channel shape formation and the said end portion of the shank is disposed therein and prevented from moving laterally.

7. In a plow having a frame and a ground working tool provided with a shank adapted to rock relatively to the frame when the plow is in operation in a forward direction, a mounting for attaching and bodily supporting the shank from the frame to carry the ground working tool including a pair of shank clamping members having clamping portions conforming with upper and lower faces of the shank, means on one of the clamping members for rigidly fixing said clamping member to the frame with the clamping portion thereof extending in the direction of movement of the plow, a fulcrum hingedly connecting the other clamping member to the fixed clamping member at one end of the clamping portions with the shank therebetween and with the clamping portions normally in contact with the corresponding faces of the shank substantially along the length of the clamping portions, a rod member having a portion at one end in connecting engagement with one of the clamping members, a spring seat on the other end of the rod member and a spring having one end engaging the spring seat and the other end seating upon the other of the clamping members to cooperate with the fulcrum in normally retaining the clamping members with the clamping portions thereof in substantially complete contact with the corresponding faces of the shank and yieldable under rocking action of the shank to maintain the clamping portion of the hinged clamping member in contact with the shank as the shank rocks away from the clamping portion of the fixed clamping member, said shank having a part thereof in stop engagement with one of said members to limit movement of the shank relatively to the clamping portion of the hinged clamping member when the shank is under rocking movement.

8. In a device as claimed in and by claim 7 wherein the rigidly fixed clamping member is of channel shape formation and the shank is disposed therein and prevented from moving laterally.

WILLIAM T. GRAHAM.

REFERENCES CITED

The following references are of record in the file of this patent:

UNITED STATES PATENTS

| Number | Name | Date |
|---|---|---|
| 407,273 | Allstatter | July 16, 1889 |
| 2,125,512 | Martins | Aug. 2, 1938 |

FOREIGN PATENTS

| Number | Country | Date |
|---|---|---|
| 225,500 | Great Britain | June 11, 1925 |